(12) United States Patent
Naka et al.

(10) Patent No.: US 12,206,128 B2
(45) Date of Patent: Jan. 21, 2025

(54) SHEET-TYPE CELL AND METHOD FOR MANUFACTURING SAME

(71) Applicant: Maxell, Ltd., Kyoto (JP)

(72) Inventors: Yasuhiro Naka, Kyoto (JP); Takahiro Furutani, Kyoto (JP)

(73) Assignee: Maxell, Ltd., Kyoto (JP)

( * ) Notice: Subject to any disclaimer, the term of this patent is extended or adjusted under 35 U.S.C. 154(b) by 613 days.

(21) Appl. No.: 17/437,139

(22) PCT Filed: Mar. 9, 2020

(86) PCT No.: PCT/JP2020/010005
§ 371 (c)(1),
(2) Date: Sep. 8, 2021

(87) PCT Pub. No.: WO2020/195745
PCT Pub. Date: Oct. 1, 2020

(65) Prior Publication Data
US 2022/0149479 A1     May 12, 2022

(30) Foreign Application Priority Data
Mar. 26, 2019   (JP) ................................ 2019-058022

(51) Int. Cl.
*H01M 50/403*   (2021.01)
*H01M 12/06*   (2006.01)
(Continued)

(52) U.S. Cl.
CPC ......... *H01M 50/403* (2021.01); *H01M 12/06* (2013.01); *H01M 50/102* (2021.01);
(Continued)

(58) Field of Classification Search
CPC ............. H01M 50/403; H01M 50/489; H01M 50/141; H01M 50/102; H01M 50/491;
(Continued)

(56) References Cited

U.S. PATENT DOCUMENTS

| 9,099,754 B2 * | 8/2015 | Komatsuki ....... H01M 10/0413 |
| 2002/0148723 A1 * | 10/2002 | Takata .................. B01D 69/02 |
| | | 204/252 |

(Continued)

FOREIGN PATENT DOCUMENTS

| EP | 3 531 501 A1 | 8/2019 |
| JP | 2004-288572 A | 10/2004 |

(Continued)

OTHER PUBLICATIONS

The decision of JPO to grant a Patent for Application JP 2021-508963 (Year: 2023).*

(Continued)

*Primary Examiner* — Alexander Usyatinsky
(74) *Attorney, Agent, or Firm* — WHDA, LLP (57) ABSTRACT

A sheet-type cell disclosed in this application includes an outer case and a power generation element contained in the outer case. The power generation element includes a positive electrode, a negative electrode, a separator, and an electrolyte solution. The separator is constituted by a porous resin sheet. The outer case includes a first outer case member and a second outer case member. Each outer case member includes a thermally fusible resin layer. The first outer case member and the second outer case member are disposed on respective opposite sides of the power generation element. A periphery of the first outer case member and a periphery of the second outer case member are sealed by thermally welding, with a periphery of the separator interposed between the peripheries of the first and second outer case members.

17 Claims, 2 Drawing Sheets

(51) Int. Cl.
  *H01M 50/102* (2021.01)
  *H01M 50/141* (2021.01)
  *H01M 50/409* (2021.01)
  *H01M 50/489* (2021.01)
  *H01M 50/491* (2021.01)
  *H01M 50/105* (2021.01)
(52) U.S. Cl.
  CPC ....... *H01M 50/141* (2021.01); *H01M 50/409* (2021.01); *H01M 50/489* (2021.01); *H01M 50/491* (2021.01); *H01M 50/105* (2021.01)
(58) Field of Classification Search
  CPC .............. H01M 50/409; H01M 12/06; H01M 50/105
  See application file for complete search history.

(56) References Cited

U.S. PATENT DOCUMENTS

| | | | |
|---|---|---|---|
| 2008/0070107 A1* | 3/2008 | Kasamatsu | H01M 50/451 429/144 |
| 2012/0208096 A1 | 8/2012 | Kuboki et al. | |
| 2014/0072864 A1* | 3/2014 | Suzuta | B32B 15/20 29/623.2 |
| 2014/0205887 A1 | 7/2014 | Tanjo et al. | |
| 2018/0254448 A1 | 9/2018 | Aya | |
| 2019/0348730 A1 | 11/2019 | Furutani et al. | |

FOREIGN PATENT DOCUMENTS

| | | |
|---|---|---|
| JP | 2007-311323 A | 11/2007 |
| JP | 2010-135111 A | 6/2010 |
| JP | 2012-48918 A | 3/2012 |
| JP | 2012-174590 A | 9/2012 |
| JP | 2015-176658 A | 10/2015 |
| JP | 2017-212179 A | 11/2017 |
| JP | 2017212179 * | 11/2017 |
| JP | 6454824 B1 | 1/2019 |

OTHER PUBLICATIONS

International Search Report dated Jun. 2, 2020, issued in counterpart International Application No. PCT/JP2020/010005 (2 pages).

The Supplementary European Search Report dated Mar. 15, 2022, issued in counterpart EP Application No. 20779434.8. (4 pages).

Office Action dated Mar. 25, 2022, issued in counterpart EP Application No. 20779434.8. (11 pages).

* cited by examiner

SHEET-TYPE CELL AND METHOD FOR MANUFACTURING SAME

TECHNICAL FIELD

The present application relates to a sheet-type cell excellent in productivity and a method for manufacturing the same.

BACKGROUND ART

An air cell includes a positive electrode and a negative electrode. The positive electrode is formed of an air electrode including a catalyst such as manganese dioxide or carbon. The negative electrode includes metal particles such as zinc-based particles, e.g., zinc particles and zinc alloy particles, as an active material. Such an air cell has been used for many years as a power supply for. e.g., a hearing aid.

This type of cell has been generally in the form of a button cell with an outer case made of a metal can, but a sheet-type cell has been developed in recent years. For example, in the sheet-type cell, an outer case is formed of aluminum laminated films used as outer case members, and a periphery of one of the outer case members proximate to a positive electrode and a periphery of the other outer case member proximate to a negative electrode are thermally welded to each other to be sealed directly (e.g., Patent Document 1).

PRIOR ART DOCUMENT

Patent Document
Patent Document 1 JP6454824 B (see e.g., Examples)

DISCLOSURE OF INVENTION

Problem to be Solved by the Invention

Meanwhile, usually, a positive electrode terminal and a negative electrode terminal are drawn from both peripheries of outer case members in such a sheet-type cell. The electrode terminals are interposed in a thermally welded portion between the peripheries of the outer case members, thereby causing poor sealing properties therebetween. Thus, for example, a step of further interposing an ionomer film between the peripheries in an area where the electrode terminals are present is required. In the case of a non-aqueous electrolyte solution cell, intrusion of moisture into the cell through a thermally welded portion of an outer case is an issue. Thus, it is required to form the thermally welded portion as thin as possible, and it is desirable to interpose as few components as possible other than the outer case in the thermally welded portion between peripheries of outer case members.

Meanwhile, in order to improve the productivity of sheet-type cells, production of sheet-type cells by a roll-to-roll method has been considered. However, in a method of placing the entire positive electrode, negative electrode, and separator in a space within an outer case, when the sizes of the positive electrode and the negative electrode are set to be as large as possible in order to obtain a sufficient capacity, there is no difference in the sizes of the positive electrode, the negative electrode, and the separator, and the accuracy of positioning of the separator is needed to be improved. This results in a reduction in the productivity.

This application has been made in view of the circumstances as described above, and provides a sheet-type cell excellent in productivity and a method for manufacturing the same.

Means for Solving Problem

A sheet-type cell disclosed in this application includes an outer case and a power generation element contained in the outer case. The power generation element includes a positive electrode, a negative electrode, a separator, and an electrolyte solution. The separator is constituted by a porous resin sheet. The outer case includes a first outer case member and a second outer case member. Each outer case member includes a thermally fusible resin layer. The first outer case member and the second outer case member are disposed on respective opposite sides of the power generation element. A periphery of the first outer case member and a periphery of the second outer case member are sealed by thermally welding, with a periphery of the separator interposed between the peripheries of the first and second outer case members.

A method for manufacturing a sheet-type cell disclosed in this application is a method for manufacturing a sheet-type cell including an outer case and a power generation element contained in the outer case. The power generation element includes a positive electrode, a negative electrode, a separator, and an electrolyte solution. The separator is constituted by a porous resin sheet. The outer case includes a first outer case member and a second outer case member. Each outer case member includes a thermally fusible resin layer. The method includes disposing the first outer case member and the second outer case member on respective opposite sides of the power generation element, and thermally welding to seal the first and second outer case members disposed on the respective opposite sides of the power generation element and the separator in a state where an outer portion of the separator facing neither the positive electrode nor the negative electrode is interposed between a periphery of the first outer case member and a periphery of the second outer case member.

Another aspect of the method for manufacturing a sheet-type cell disclosed in this application is a method for manufacturing a sheet-type cell including: an outer case; and a power generation element and a water repellent membrane that are contained in the outer case. The power generation element includes a positive electrode, a negative electrode, a separator, and an electrolyte solution. The water repellent membrane is disposed between the outer case and the positive electrode. The separator is constituted by a porous resin sheet. The outer case includes a first outer case member and a second outer case member. Each outer case member includes a thermally fusible resin layer. The method includes disposing the first outer case member and the second outer case member on respective opposite sides of the power generation element provided with the water repellent membrane on an outer surface of the positive electrode in the power generation element, and thermally welding to seal the first and second outer case members disposed on the respective opposite sides of the power generation element, the water repellent membrane, and the separator in a state where an outer portion of the water repellent membrane not facing the positive electrode and an outer portion of the separator facing neither the positive electrode nor the negative electrode are interposed between a periphery of the first outer case member and a periphery of the second outer case member.

Effects of the Invention

With this application, it is possible to provide a sheet-type cell excellent in productivity and a method for manufacturing the same.

DESCRIPTION OF THE INVENTION (Sheet-Type Cell)

The sheet-type cell of this application can be used as various primary cells and secondary cells, and can suitably be used as various cells (such as alkaline cells (alkaline primary cells and alkaline secondary cells), manganese cells, and air cells) including an aqueous electrolyte solution, i.e., an electrolyte solution composed of an aqueous solution containing water as a solvent.

An embodiment of the sheet-type cell of this application will be described. A sheet-type cell of this embodiment includes an outer case and a power generation element contained in the outer case. The power generation element includes a positive electrode, a negative electrode, a separator, and an electrolyte solution. The separator is constituted by a porous resin sheet. The outer case includes a first outer case member and a second outer case member. Each outer case member includes a thermally fusible resin layer. The first outer case member and the second outer case member are disposed on respective opposite sides of the power generation element. A periphery of the first outer case member and a periphery of the second outer case member are sealed by thermally welding, with a periphery of the separator interposed between the peripheries of the first and second outer case members.

Hereinafter, the sheet-type cell f this embodiment will be described with reference to the drawings.

Figure 1:
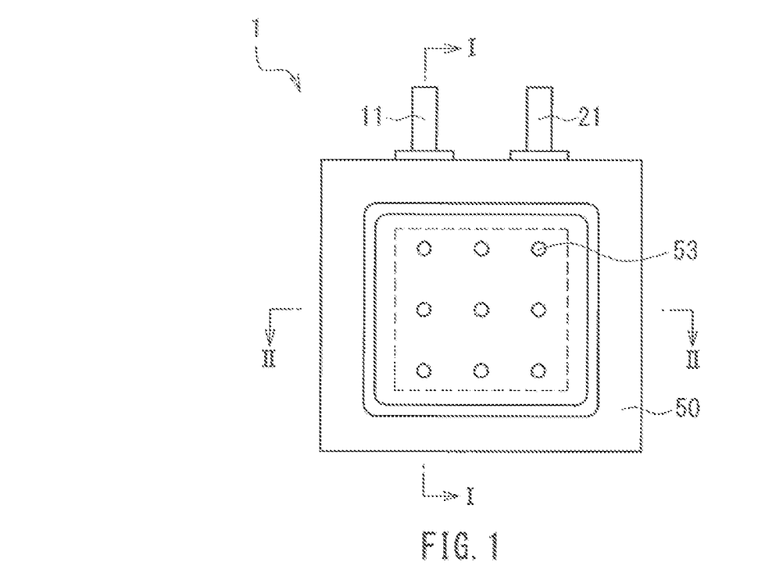
FIG. 1 is a plan view schematically illustrating an example of a sheet-type cell of an embodiment.
Figure 2:
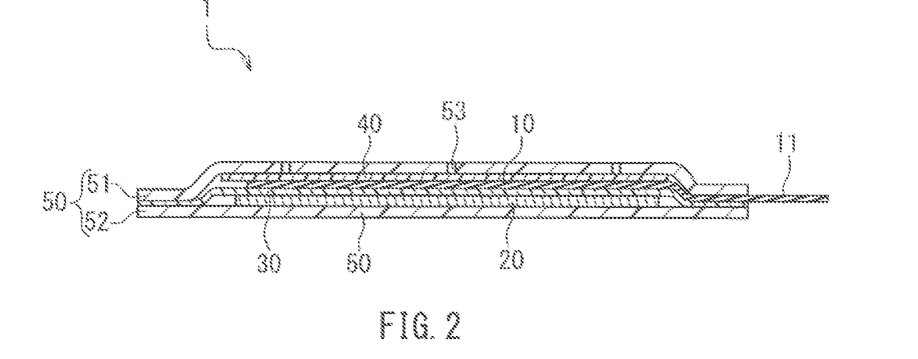
FIG. 2 is a cross-sectional view taken along the line I-I in FIG. 1.
Figure 3:
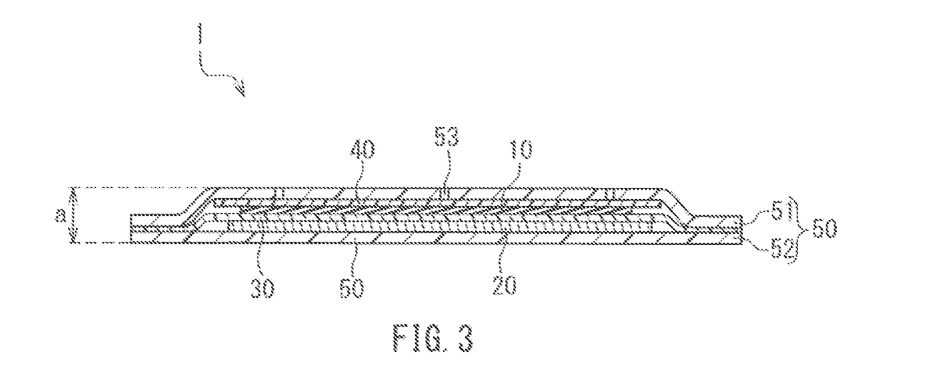
FIG. 3 is a cross-sectional view taken along the line II-II in FIG. 1.

FIGS. 1, 2, and 3 schematically illustrate an example of the sheet-type cell of this embodiment used as an air cell. FIG. 1 is a plan view of a sheet-type cell 1. FIG. 2 is a cross-sectional view taken along the line I-I in FIG. 1. FIG. 3 is a cross-sectional view taken along the line II-II in FIG. 1.

As illustrated in FIGS. 1.2, and 3, in the sheet-type cell (air cell) 1, a positive electrode 10, a separator 30, a negative electrode 20, and an electrolyte solution (not illustrated) that constitute a power generation element are contained in an outer case (sheet-type outer case) 50. The outer case 50 includes a first outer case member 51 (e.g., proximate to the positive electrode) and a second outer case member 52 (e.g., proximate to the negative electrode), and peripheries of these are united by thermally welding together.

In this embodiment, the outer case members 51, 52 are formed as separate members and disposed on respective opposite sides of the power generation element. However, an outer case member may be formed as one continuous sheet and be folded to hold the power generation element such that the outer case member is disposed on the opposite sides of the power generation element.

In FIG. 1, the dotted line represents the size of the positive electrode 10 (corresponding to the size of a wide main body portion other than a terminal 11 of the positive electrode, i.e., the size of a catalyst layer of the positive electrode described later) contained in the outer case 50.

Moreover, in the sheet-type cell 1, a negative electrode is disposed in the middle with positive electrodes disposed on opposite sides thereof, or a positive electrode is disposed in the middle with negative electrodes disposed on opposite sides thereof.

In FIG. 1, the terminal 11 of the positive electrode 10 and a terminal 21 of the negative electrode 20 protrude from the upper side of the outer case 50. The terminals 11, 21 are used to electrically connect the sheet-type cell 1 to the applicable equipment.

The outer case 50 has a plurality of air holes 53 in the side where the positive electrode 10 is provided so as to take air into the positive electrode. A water repellent membrane 40 is provided on the surface of the positive electrode 10 that faces the outer case 50 to prevent leakage of the electrolyte solution through the air holes 53.

As illustrated in FIGS. 2 and 3, the positive electrode 10, the negative electrode 20, the separator 30, the water repellent membrane 40, and the outer case 50 have a single layer structure (FIGS. 5 and 6 described later are similar to these figures). However, these components may have a multilayer structure in a sheet-type cell, as described later.

As illustrated in FIGS. 2 and 3, in the sheet-type ell 1, an outer portion (periphery) of the separator 30 facing neither the positive electrode 10 nor the negative electrode 20 is interposed between the outer case member 51 proximate to the positive electrode and the outer case member 52 proximate to the negative electrode. In this state, the outer case members 51, 52, and the separator 30 are sealed by thermally welding together.

As above, in the sheet-type cell of this embodiment, the outer case members and the separator are thermally welded together to seal the cell in a state where the outer portion (periphery) of the separator facing neither the positive electrode nor the negative electrode is interposed between the outer case member proximate to the positive electrode and the outer case member proximate to the negative electrode. Thus, the separator has a sufficiently larger area than the positive electrode and the negative electrode, thereby permitting some positional deviation of the separator. Therefore, the cell productivity can be improved.

The size of the separator (size in a plan view) may be any size that enables the outer portion thereof to be interposed between the outer case member proximate to the positive electrode and the outer case member proximate to the negative electrode and enables the outer portion and the outer case members to be thermally welded together. The size of the separator may be smaller than those of the outer case member proximate to the positive electrode and the outer case member proximate to the negative electrode. However, more preferably, the size of the separator is defined such that ends of the outer case members are aligned with those of the separator as illustrated in FIGS. 2 and 3. In this case, when the outer case members are cut, the separator stacked together with the outer case members can be cut simultaneously. Therefore, the sheet-type cell is suitable for production by a roll-to-roll method, and the productivity of the sheet-type call can be further improved.

When the outer case and the separator are rectangular as illustrated in FIG. 1, preferably, an end of one side of the outer case is aligned with that of the separator, and more preferably, ends of two opposite sides of the outer case are aligned with those of the separator. Moreover, most preferably, ends of all sides of the outer case are aligned with those of the separator regardless of their shapes, that is, the separator and the outer case have the same size in a plan view in terms of production efficiency. FIGS. 2 and 3 illustrate the case where the separator 30 and the outer case 50 have the same size in a plan view.

Usually, in an air cell, a water repellent membrane is disposed between a positive electrode and an outer case member proximate to the positive electrode. In the sheet-type cell of this embodiment, as illustrated in FIGS. 2 and 3, a size of a water repellent membrane can be adjusted to be contained in a space within the outer case. The water repellent membrane can be attached or thermally welded to the entire region where air holes are provided so as to cover the air holes provided in the outer case member proximate to the positive electrode.

However, when the sheet-type cell of this embodiment is used as an air cell, an outer portion (periphery) of the water repellent membrane not facing the positive electrode is preferably thermally welded together with the separator in a state where the outer portion and the separator are interposed between the outer case member proximate to the positive electrode and the outer case member proximate to the negative electrode in terms of further improving the productivity of the sheet-type cell. In other words, it is preferable to seal a portion where an outer portion (periphery) of the separator facing neither the positive electrode nor the negative electrode is laid on an outer portion (periphery) of the water repellent membrane not facing the positive electrode, by thermally welding so as to unite the outer portions and the peripheries of the outer case members in the portion as a whole.

Figure 4:
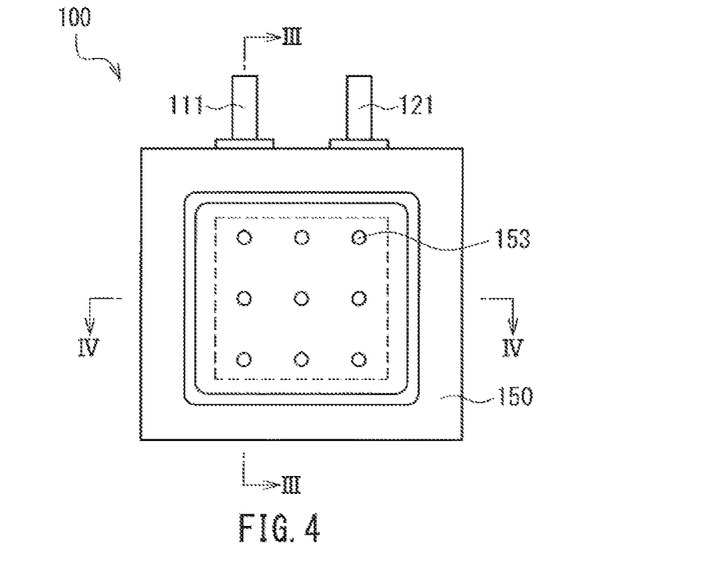
FIG. 4 is a plan view schematically illustrating another aspect of the sheet-type cell of the embodiment.
Figure 5:
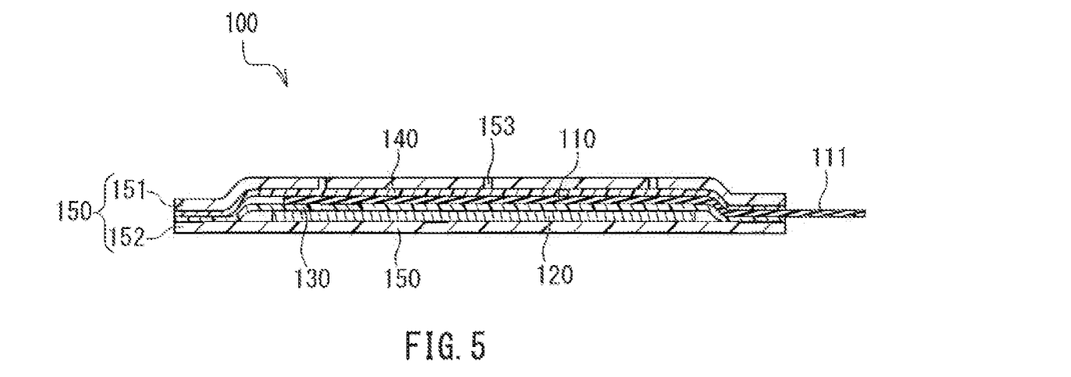
FIG. 5 is a cross-sectional view taken along the line III-III in FIG. 4.
Figure 6:
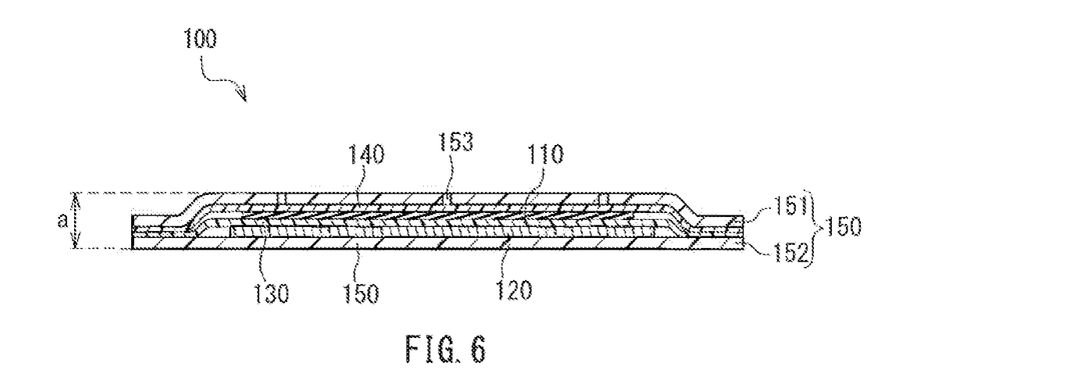
FIG. 6 is a cross-sectional view taken along the line IV-IV in FIG. 4.

FIGS. 4, 5, and 6 schematically illustrate another aspect of the sheet-type cell that is different from the previously-described sheet-type cell of this embodiment used as an air cell. FIG. 4 is a plan view of a sheet-type cell 100. FIG. 5 is a cross-sectional view taken along the line III-III in FIG. 4. FIG. 6 is a cross-sectional view taken along the line IV-IV in FIG. 4.

As illustrated in FIGS. 4, 5, and 6, in the sheet-type cell (air cell) 100, a positive electrode 110, a separator 130, a negative electrode 120, and an electrolyte solution (not illustrated) that constitute a power generation element are contained in an outer case (sheet-type outer case) 150 in the same manner as in the sheet-type cell 1 illustrated in FIGS. 1,2, and 3. The outer case 150 includes a first outer case member 151 (e.g., proximate to the positive electrode) and a second outer case member 152 (e.g., proximate to the negative electrode), and peripheries of these are united by thermally welding together. Also, in this case, an outer case member may be formed as one continuous sheet and be folded such that the outer case member is disposed on opposite sides of the power generation element. In FIG. 4, the dotted line is similar to the dotted line in FIG. 1.

In FIG. 4, a terminal 111 of the positive electrode 110 and a terminal 121 of the negative electrode 120 for electrically connecting the sheet-type cell 100 to the applicable equipment protrude from the upper side of the outer case 150. The outer case 150 has a plurality of air holes 153 in the side where the positive electrode 110 is provided so as to take air into the positive electrode. A water repellent membrane 140 is provided on the surface of the positive electrode 110 that faces the outer case 150 to prevent leakage of the electrolyte solution through the air holes 153 and prevent moisture from entering from outside.

Also, in FIGS. 5 and 6, the positive electrode 110, the negative electrode 120, the separator 130, the water repellent membrane 140, and the outer case 150 have a single layer structure in the same manner as in FIGS. 2 and 3.

In the sheet-type cell 100 illustrated in FIGS. 5 and 6, an outer portion (periphery) of the water repellent membrane 140 not facing the positive electrode 110 is thermally welded together with an outer portion (periphery) of the separator 130 facing neither the positive electrode 110 nor the negative electrode 120 to seal the cell in a state where the outer portions are interposed between the outer case member 151 proximate to the positive electrode and the outer case member 152 proximate to the negative electrode. Thus, the separator and the water repellent membrane have a sufficiently larger area than the positive electrode and the negative electrode, thereby permitting some positional deviation of the separator and that of water repellent membrane. Therefore, the cell productivity can be further improved.

In the case of the sheet-type cell (air cell) illustrated in FIGS. 5 and 6, the size of the water repellent membrane (size in a plan view) may be any size that enables the outer portion thereof to be interposed between the outer case member proximate to the positive electrode and the outer case member proximate to the negative electrode and enables the outer portion and the outer case members to be thermally welded together. The size of the water repellent membrane may be smaller than those of the outer case member proximate to the positive electrode and the outer case member proximate to the negative electrode. However, more preferably, the size of the water repellent membrane is defined such that ends of the outer case are aligned with those of the water repellent membrane as illustrated in FIGS. 5 and 6. In this case, when the outer case members are cut, the water repellent membrane stacked together with the outer case members can be cut simultaneously. Therefore, the productivity of the sheet-type cell can be further improved.

When the outer case and the water repellent membrane are rectangular as illustrated in FIG. 4, preferably, an end of one side of the outer case is aligned with that of the water repellent membrane, and more preferably, ends of two opposite sides of the outer case are aligned with those of the water repellent membrane. When the outer case, the water repellent membrane and the separator are rectangular, preferably, an end of one side of the outer case is aligned with that of the water repellent membrane and that of the separator, and more preferably, ends of two opposite sides of the outer case are aligned with those of the water repellent membrane and the separator. Particularly preferably, ends of all sides of the water repellent membrane and the outer case are aligned with each other regardless of their shapes, that is, the water repellent membrane and the outer case have the same size in a plan view. Most preferably, ends of all sides of the water repellent membrane, the separator, and the outer case are aligned with each other regardless of their shapes, that is, the water repellent membrane, the separator, and the outer case have the same size in a plan view. FIGS. 5 and 6 illustrate the case where the water repellent membrane 140 has the same size as the separator 130 and the outer case 150 in a plan view.

Next, the components and their related matters of the sheet-type cell of this embodiment will be described.

<Separator>

As the separator of the sheet-type cell of this embodiment, a porous resin sheet is used. Examples of the porous resin sheet include a porous resin film (e.g., a microporous film for a separator or a membrane for a filter) and a resin nonwoven fabric. The separator may be a stack of the porous film and the nonwoven fabric.

The porous resin sheet is preferably made of a resin that fuses at a temperature of 200° C. or less (i.e., a resin having a melting temperature of 200° C. or less measured in accordance with the Japanese Industrial Standards (JIS) K 7121) in terms of enhancing thermally welding properties.

Specific examples of the resin of the porous resin sheet include polyolefins such as polyethylene (PE) and polypropylene (PP), and an ethylene-propylene copolymer.

The air permeability of the separator is preferably 3000 sec/100 ml or less in terms of achieving good ion permeability, and preferably 10 sec/100 ml or more in terms of ensuring good strength.

In this specification, the air permeability of the separator and the air permeability of the water repellent membrane (described later) can be determined by the Gurley method specified in JIS P 8117.

The porosity of the separator is preferably 30% to 80%. Moreover, the thickness of the separator is preferably 10 to 100 μm.

<Water Repellent Membrane>

When the sheet-type cell of this embodiment is an air cell, the water repellent membrane has not only water repellency, but also air permeability. Specific examples of the water repellent membrane include a membrane (porous film) made of a resin such as fluororesin (e.g., polytetrafluoroethylene (PTFE)) or polyolefins (e.g., polypropylene and polyethylene). Moreover, the water repellent membrane can be of a multilayer structure in which a porous polyolefin layer is provided on a porous resin base (e.g., a nonwoven fabric made of polyester such as polyethylene terephthalate (PET) or a polyolefin).

As illustrated in FIGS. 5 and 6, in the sheet-type cell in which the water repellent membrane is thermally welded together with the separator, the water repellent membrane preferably includes a porous layer made of a resin that fuses at a temperature of 200° C. or less (i.e., a resin having a melting temperature of 200° C. or less measured in accordance with JIS K 7121) in terms of enhancing thermally welding properties. Examples of such a water repellent membrane include a membrane (porous film) formed of only a parous layer made of a resin that fuses at a temperature of 200° C. or less and a membrane having a multilayer structure in which the porous layer made of a resin that fuses at a temperature of 200° C. or less is provided on a porous resin base. As the resin that fuses at a temperature of 200° C. or less, a polyolefin such as polypropylene or polyethylene can be used. As the resin of the porous resin base, polyester such as polyethylene terephthalate (PET) can be used, for example.

The air permeability of the water repellent membrane is preferably 60000 sec/100 ml or less in terms of achieving good permeability for air (oxygen). Moreover, the air permeability thereof is preferably 20 sec/100 ml or more, more preferably 1000 sec/100 ml or more, and particularly preferably 3000 sec/100 ml or more in terms of preventing leakage of the electrolyte solution and ensuring good strength.

The thickness of the water repellent membrane is preferably 50 to 250 μm.

<Positive Electrode>

When the sheet-type cell is an alkaline cell or a manganese cell, the positive electrode of the sheet-type cell of this embodiment may have a structure in which a positive electrode mixture layer containing, e.g., a positive electrode active material, a conductive assistant, and a binder is formed on one side or both sides of a current collector. Examples of the positive electrode active material include silver oxides (such as silver (I)oxide and silver (II) oxide), manganese oxides such as manganese dioxide, nickel oxyhydroxide, and composite oxides of silver and cobalt, nickel, or bismuth.

Examples of the conductive assistant of the positive electrode mixture layer include the following: carbon materials such as carbon blacks of acetylene black, Ketjenblack, channel black, furnace black, lamp black, thermal black, etc. and carbon fibers; conductive fibers such as metallic fibers; carbon fluoride; metal powders of copper, nickel, etc.; and organic conductive materials such as polyphenylene derivatives.

Examples of the binder of the positive electrode mixture layer include the following: polyvinylidene fluoride (PVDF), polytetrafluoroethylene (PTFE), styrene-butadiene rubber (SBR), carbaoxymethyl cellulose (CMC), and polyvinylpyrrolidone (PVP).

In the composition of the positive electrode mixture layer, the amount of the positive electrode active material is preferably 80 to 98% by mass, the content of the conductive assistant is preferably 1.5 to 10% by mass, and the content of the binder is preferably 0.5 to 10% by mass. The thickness of the positive electrode mixture layer is preferably 30 to 300 μm (per one side of the current collector).

The positive electrode having the positive electrode mixture layer can be produced in the following manner. For example, the positive electrode active material, the conductive assistant, and the binder are dispersed in water or an organic solvent such as N-methyl-2-pyrrolidone (NMP) to prepare a positive electrode mixture containing composition, e.g., in the form of slurry or paste (in this case, the binder may be dissolved in the solvent). This composition is applied to the current collector, dried, and optionally subjected to pressing such as calendering.

When the sheet-type cell of this embodiment is an air cell, the positive electrode (air electrode) has a catalyst layer. For example, the positive electrode with a laminated structure of the catalyst layer and the current collector may be used.

The catalyst layer may contain, e.g., a catalyst and a binder.

Examples of the catalyst of the catalyst layer include the following: silver, platinum metals or alloys thereof transition metals; platinum/metal oxides such as $Pt/IrO_2$; perovskite oxides such as $La_{1-x}Ca_xCoO_3$; carbides such as WC; nitrides such as $Mn_4N$; phthalocyanine compound metal complexes; manganese oxides such as manganese dioxide; and carbon (including, e.g., graphite, carbon black (acetylene black, Ketjenblack, channel black, furnace black, lamp black, thermal black, etc.), charcoal, and activated carbon). These catalysts may be used alone or in combinations of two or more.

The heavy metal content in the catalyst layer, except for the components of the electrolyte, is preferably 1% by mass or less. When the positive electrode has the catalyst layer with a low heavy metal content, the environmental impact can be reduced even if the cell is disposed of without any special treatment.

In this specification, the heavy metal content in the catalyst layer can be measured by X-ray fluorescence analysis. For example, the measurement can be performed using an X-ray fluorescence analyzer "ZSX100e" manufactured by Rigaku Corporation under the following conditions: excitation source, Rh 50 kV; and analysis area, φ 10 mm.

It is recommended that the catalyst of the catalyst layer should contain no heavy metal, but preferably contain the various types of carbon as described above.

In terms of further improving the reactivity of the positive electrode, the specific surface area of the carbon that is used as the catalyst is preferably 200 m$^2$/g or more, more preferably 300 m$^2$/g or more, and further preferably 500 m$^2$/g or more. In this specification, the specific surface area of the carbon is determined by a BET method in accordance with JIS K 6217. For example, the specific surface area of the carbon can be measured with a specific surface area measuring device ("Macsorb HM model-1201" manufactured by Mountech Co., Ltd) based on a nitrogen adsorption method. The upper limit of the specific surface area of the carbon is usually about 2000 m$^2$/g.

The content of the catalyst in the catalyst layer is preferably 20 to 70% by mass.

Examples of the binder of the catalyst layer include fluorocarbon resin binders such as PVDF, PTFE, copolymers of vinylidene fluoride, and copolymers of tetrafluoroethylene (including, e.g., a vinylidene fluoride-hexafluoropropylene copolymer (PVDF-HFP), a vinylidene fluoride-chlorotrifluoroethylene copolymer (PVDF-CTFE), a vinylidene fluoride-tetrafluoroethylene copolymer (PVDF-TFE), and a vinylidene fluoride-hexafluoropropylene-tetrafluoroethylene copolymer (PVDF-HFP-TFE)). Among them, polymers of tetrafluoroethylene (PTFE) or copolymers of tetrafluoroethylene are preferred, and PTFE is more preferred. The content of the binder in the catalyst layer is preferably 3 to 50% by mass.

The positive electrode of the air cell can be produced by, e.g., mixing the above catalyst, binder, or the like with water, rolling the mixture between rotating rolls, and bringing the rolled material into close contact with the current collector. There may be another way of producing the positive electrode, as follows. First, a composition (slurry, paste, etc.) for forming a catalyst layer is prepared by dispersing, the above catalyst and optionally the binder or the like in water or an organic solvent. Then, the composition is applied to the surface of the current collector and dried, which is further subjected to pressing (e.g., calendering) as needed.

The catalyst layer may be a porous carbon sheet made of fibrous carbon such as carbon paper, carbon cloth, or carbon felt. The carbon sheet can also be used as a current collector of the positive electrode, as will be described later. The carbon sheet can serve as both the catalyst layer and the current collector.

The current collector of the positive electrode may be, e.g., a mesh, foil, expanded metal, or punched metal made of metals such as titanium, nickel, stainless steel, and copper or may be, e.g., a mesh or sheet made of carbon. The thickness of the current collector of the positive electrode is preferably 10 μm or more and 300 μm or less.

The current collector of the positive electrode can be provided by applying a carbon paste to an inner surface of the outer case. When the outer case members constituting the outer case include a metal layer, the metal layer can be a current collector. In either case, the positive electrode mixture layer or the catalyst layer can be formed on the surface of the current collector in the same manner as described above, thus producing a positive electrode. The thickness of the current collector made of the carbon paste is preferably 30 to 300 μm.

<Negative Electrode>

The negative electrode of the sheet-type cell of this embodiment may contain a metal material. Examples of the metal material include the following: a zinc-based material (which collectively refers to both a zinc material and a zinc alloy material); a magnesium-based material (which collectively refers to both a magnesium material and a magnesium alloy material); and an aluminum-based material (which collectively refers to both an aluminum material and an aluminum alloy material). In this negative electrode, metals such as zinc, magnesium, and aluminum act as an active material.

Specifically, the negative electrode containing the metal material may be a negative electrode containing metal particles such as zinc-based particles (which collectively refer to both zinc particles and zinc alloy particles), magnesium-based particles (which collectively refer to both magnesium particles and magnesium alloy particles), and aluminum-based particles (which collectively refer to both aluminum particles and aluminum alloy particles).

Examples of the alloy constituents of the zinc alloy particles include indium (the content is, e.g., 0.005 to 0.05% by mass), bismuth (the content is, e.g., 0.005 to 0.2% by mass), and aluminum (the content is, e.g., 0.001 to 0.15% by mass).

Examples of the alloy constituents of the magnesium alloy particles include calcium (the content is, e.g., 1 to 3% by mass), manganese (the content is, e.g., 0.1 to 0.5% by mass), zinc (the content is, e.g., 0.4 to 1% by mass), and aluminum (the content is, e.g., 8 to 10% by mass).

Examples of the alloy constituents of the aluminum alloy particles include zinc (the content is, e.g., 0.5 to 10% by mass), tin (the content is, e.g., 0.04 to 1.0% by mass), gallium (the content is, e.g., 0.003 to 1.0% by mass), silicon (the content is, e.g., 0.05% by mass or less), iron (the content is, e.g., 0.1% by mass or less), magnesium (the content is, e.g., 0.1 to 2.0% by mass), and manganese (the content is, e.g., 0.01 to 0.5% by mass).

The negative electrode may contain only one type of metal particles or two or more types of metal particles.

In view of a reduction in the environmental impact of the cell for disposal, it is preferable that the metal material used for the negative electrode contains the smallest possible amount of mercury, cadmium, lead, and chromium. Specifically, it is more preferable that the mercury content is 0.1% by mass or less, the cadmium content is 0.01% by mass or less, the lead content is 0.1% by mass or less, and the chromium content is 0.1% by mass or less.

The particle size of the zinc-based particles may be defined as follows. For example, the proportion of the particles with a particle diameter of 75 μm or less is preferably 50% by mass or less, and more preferably 30% by mass or less of all particles. Moreover, the proportion of the particles with a particle diameter of 100 to 200 μm may be 50% by mass or more, and more preferably 90% by mass or more of all particles.

Moreover, the particle size of the magnesium-based particles and the aluminum-based particles may be defined as follows. For example, the proportion of the particles with a particle diameter of 30 μm or less is preferably 50% by mass or less, and more preferably 30% by mass or less of all articles. Moreover, the proportion of the particles with a particle diameter of 50 to 200 μm may be 50% by mass or more, and more preferably 90% by mass or more of all particles.

In the present specification, the particle size of the metal particles means a particle diameter ($D_{50}$) at a cumulative frequency of 50% in the volume-based distribution, which is measured with a laser scattering particle size distribution analyzer (e.g., "LA-920" manufactured by HORIBA, Ltd.) by dispersing the particles in a medium that does not dissolve those particles.

When the negative electrode contains the metal particles, for example, a thickening agent (e.g., any of later-described thickening agents that can be used to produce a gel electrolyte) and a binder may be added as needed. This may be mixed with an electrolyte solution to form a negative electrode agent (such as a gel-like negative electrode). The amount of the thickening agent in the negative electrode is preferably, e.g., 0.5 to 1.5% by mass. The amount of the binder in the negative electrode is preferably 0.5 to 3% by mass.

The electrolyte solution used for the negative electrode containing the metal particles may be the same as that described later.

The content of the metal particles in the negative electrode is preferably, e.g., 60% by mass or more, and more preferably 65% by mass or more. The content of the metal particles in the negative electrode is also preferably 95% by mass or less, and more preferably 90% by mass or less.

The negative electrode containing the metal particles preferably contains an indium compound. The presence of the indium compound in the negative electrode can more effectively prevent the generation of hydrogen gas due to a corrosion reaction between the metal particles and the electrolyte.

Examples of the indium compound include indium oxide and indium hydroxide.

The amount of the indium compound in the negative electrode is preferably 0.003 to 1 with respect to 100 of the metal particles at a mass ratio.

The negative electrode may also be a metal sheet such as a zinc-based sheet (e.g., zinc foil or zinc alloy foil) or a magnesium-based sheet (e.g., magnesium fil or magnesium alloy foil). Such a negative electrode preferably has a thickness of 10 to 500 μm.

The composition of the zinc-based sheet can be the same as that of the zinc-based particles. The composition of the magnesium-based sheet can be the same as that of the magnesium-based particles. However, the zinc-based sheet is preferably made of a zinc alloy containing at least bismuth in order to suppress the reaction with the electrolyte solution. The content of bismuth in the zinc alloy is preferably 0.005 to 0.1% by mass.

The negative electrode containing the metal material may include a current collector as needed. The current collector of the negative electrode may be, e.g., a mesh, fail, expanded metal, or punched metal made of metals such as nickel, copper, and stainless steel or may be, e.g., a sheet or mesh made of carbon. The thickness of the current collector of the negative electrode is preferably 10 μm or more 300 μm or less.

The current collector of the negative electrode can be provided by applying a carbon paste to an inner surface of the outer case in the same as that of the positive electrode. When the outer case members constituting the outer case include a metal layer, the metal layer can be a current collector like that of the positive electrode. The thickness of the current collector made of the carbon paste is preferably 50 to 200 μm.

<Electrolyte Solution>

As the electrolyte solution of the sheet-type cell of this embodiment, an aqueous solution containing an electrolyte salt is used. When the sheet-type cell is a manganese cell or an air cell, the pH of the aqueous solution used as the electrolyte solution is preferably 3 or more, more preferably 4 or more, and particularly preferably 5 or more. The pH of the aqueous solution is preferably less than 12, more preferably 10 or less, and further preferably less than 7. Compared to, e.g., a strong alkaline aqueous solution with a high pH (a pH of about 14) commonly used in air cells, the aqueous solution having a pH within the above range is less likely to cause a problem even if the electrolyte adheres to a human body due to the fracture of the cell when discarded or in use. The aqueous solution can ensure high safety and reduce the environmental impact after disposal.

Meanwhile, when the sheet-type cell is an alkaline cell, the pH of the electrolyte solution can be as high as 12 or more, and even. e.g., 14 or more.

When the sheet-type cell is an air cell or a manganese cell, examples of the electrolyte salt dissolved in the aqueous solution used as the electrolyte solution include the following: chlorides such as sodium chloride, potassium chloride, magnesium chloride, calcium chloride, ammonium chloride, and zinc chloride; hydroxides of alkali metals or alkaline-earth metals (e.g., sodium hydroxide, potassium hydroxide, and magnesium hydroxide), acetates of these (e.g., sodium acetate, potassium acetate, and magnesium acetate), nitrates of these (e.g., sodium nitrate, potassium nitrate, and magnesium nitrate), sulfates of these (e.g., sodium sulfate, potassium sulfate, and magnesium sulfate), phosphates of these (e.g., sodium phosphate, potassium phosphate, and magnesium phosphate), borates of these (e.g., sodium borate, potassium borate, and magnesium borate), citrates of these (e.g., sodium citrate, potassium citrate, and magnesium citrate), and glutamates of these (e.g., sodium glutamate, potassium glutamate, and magnesium glutamate); hydrogencarbonates of alkali metals (e.g., sodium hydrogencarbonate and potassium hydrogencarbonate); percarbonates of alkali metals (e.g., sodium percarbonate and potassium percarbonate); compounds containing halogens such as fluorides; and polycarboxylic acids. The aqueous solution may contain either one or two or more of these electrolyte salts.

When the sheet-type cell is an air cell, the aqueous solution that can be used as the electrolyte solution preferably contains a water-soluble high-boiling solvent with a boiling point of 150° C. or more along with water. As the air cell is discharged, the voltage decreases with a decrease in the capacity. In the late stage of discharge, since the capacity of the air cell becomes smaller, the voltage not only decreases but also tends to vary greatly. However, the presence of the water-soluble high-boiling solvent in the aqueous solution can suppress such a voltage variation in the late stage of discharge. Thus, the sheet-type air cell can have better discharge characteristics. The upper limit of the boiling point of the water-soluble high-boiling solvent is usually 320° C.

It is desirable that the water-soluble high-boiling solvent has a high surface tension and a high relative dielectric constant. Specific examples of the water-soluble high-boiling solvent include the following: polyhydric alcohols such as ethylene glycol (boiling point: 197° C., surface tension: 48 mN/m, relative dielectric constant: 39), propylene glycol (boiling point: 188° C., surface tension: 36 mN/m, relative dielectric constant: 32), and glyceol (boiling point: 290° C., surface tension: 63 mN/m, relative dielectric constant: 43); and polyalkylene glycol (having a molecular weight of preferably 600 or less) such as polyethylene glycol (e.g., boiling point: 230° C., surface tension: 43 mN/m, relative dielectric constant: 35). The electrolyte solution may contain either only one or two or more of these water-soluble high-boiling solvents, and more preferably may contain glycerol.

To satisfactorily ensure the effect of the water-soluble high-boiling solvent when it is used, the content of the water-soluble high-boiling solvent in the aqueous solution is preferably 1% by mass or more, and more preferably 3% by mass or more of the total solvent. However, if the amount of the water-soluble high-boiling solvent in the aqueous solution is too large, the ionic conduction of the aqueous solution becomes too small, so that the cell characteristics may be reduced. Thus, the content of the water-soluble high-boiling solvent in the aqueous solution is preferably 30% by mass or less, and more preferably 20% by mass or less of the total solvent.

The concentration of the electrolyte salt in the aqueous solution may be set so that the conductivity of the aqueous solution can be adjusted, e.g., to about 80 to 700 mS/cm. The concentration of the electrolyte salt is usually 5 to 50% by mass.

When the sheet-type cell is an alkaline cell, the electrolyte solution may be an alkaline electrolyte solution. Specifically, the alkaline electrolyte solution may be, e.g., an alkaline aqueous solution composed of an aqueous solution of alkali metal hydroxide such as potassium hydroxide, sodium hydroxide, or lithium hydroxide. The alkaline electrolyte solution may also be obtained by adding zinc oxide to the alkaline aqueous solution. The concentration of the alkali metal hydroxide in the alkaline electrolyte solution is preferably 28 to 38% by mass in the case of e.g., potassium hydroxide. When the alkaline electrolyte solution contains zinc oxide, the concentration of the zinc oxide is preferably 1.0 to 4.0% by mass.

It is preferable that an indium compound is dissolved in the solvent (water or a mixed solvent of water and the water-soluble high-boiling solvent) of the aqueous solution used as the electrolyte solution. When the indium compound is dissolved in the aqueous solution, the generation of hydrogen gas inside the cell can be adequately suppressed.

Examples of the indium compound dissolved in the aqueous solution include indium hydroxide, indium oxide, indium sulfate, indium sulfide, indium nitrate, indium bromide, and indium chloride.

The concentration of the indium compound in the aqueous solution is preferably 0.005% by mass or more, mom preferably 0.01% by mass or more, and particularly preferably 0.05% by mass or more. The concentration of the indium compound in the aqueous solution is also preferably 1% by mass or less, more preferably 0.5% by mass or less, and particularly preferably 0.1% by mass or less.

In addition to the above described components, the aqueous solution may optionally contain various known additives. For example, zinc oxide may be added to the aqueous solution to prevent corrosion (oxidation) of the metal material used for the negative electrode.

The aqueous solution used as the electrolyte solution may be gelled, and a gel electrolyte solution (gel electrolyte) is also preferably used as the electrolyte solution of the sheet-type cell. The gel electrolyte solution may be prepared by mixing the aqueous solution containing the electrolyte salt and a thickening agent (such as sodium polyacrylate, carboxymethyl cellulose, or polyoxyethylene). The use of the gel electrolyte solution can also suppress the voltage variation in the late stage of discharge and can further improve the discharge characteristics of the sheet-type cell. When the sheet-type cell is an air cell, the vaporization of water from the gel electrolyte solution is reduced. Therefore, it is possible to suppress a reduction in the discharge characteristics due to the composition change of the electrolyte solution, and to further improve the storage characteristics of the sheet-type air cell.

<Outer Case>

As long as the outer case members constituting the outer case of the sheet-type cell of this embodiment include a thermally fusible resin layer in their thermally welded portion, the specific configurations of the outer case members are not limited. For example, a laminated film obtained by stacking a thermally fusible resin layer (which is hereinafter also referred to as a thermal fusion resin layer) on a resin layer that is to be a base (which is hereinafter also referred to as a base resin layer) can be used as each of the outer case members.

The outer case is sealed by thermally welding the ends of the first outer case member (e.g., proximate to the positive electrode) and those of the second outer case member (e.g., proximate to the negative electrode) together. When each outer case member is the laminated film, the thermally welded portion is on the side of the thermal fusion resin layer. Thus, the thermal fusion resin layer of the outer case member is disposed on each of the inner surfaces of the outer case.

The thermal fusion resin layer can be made of a resin that fuses at a temperature of 200° C. or less. When the resin that fuses at a temperature of 200° C. or less has a melting point, the resin is a resin having a melting temperature of 200° C. or less measured in accordance with JIS K 7121. When the resin that fuses at a temperature of 200° C. or less does not have a melting point, the resin is a resin having a glass transition temperature of 200° C. or less measured in accordance with JIS K 7121. Specific examples of the resin that fuses at a temperature of 200° C. or less include polyolefins such as polyethylene and polypropylene, and modified polyolefins (such as modified polyolefin ionomers). The thickness of the thermal fusion resin layer is preferably 20 to 100 μm.

The base resin layer is made of a resin having a higher melting point or glass transition temperature than the thermal fusion resin layer. Specific examples of the base resin layer include a nylon film (e.g., a nylon 66 film) and a polyester film (e.g., a polyethylene terephthalate (PT film). The thickness of the base resin layer is preferably 20 to 100 μm.

Moreover, when each outer case member is formed of the laminated film, a metal layer may further be formed thereon. The metal layer may be made of e.g., a vapor deposited film of aluminum (including an aluminum alloy), an aluminum film (including an aluminum foil and aluminum alloy foil) or a stainless steel film (including a stainless steel foil). The thickness of the metal layer is preferably 10 to 150 μm.

When each outer case member is formed of the laminated film, an electrically insulating oxide layer may further be disposed on a surface of the base resin layer that is opposite to the thermal fusion resin layer in order to prevent the permeation of moisture through the outer case members.

Examples of an oxide of the electrically insulating oxide layer include inorganic oxides such as aluminum oxide and silicon oxide. A layer composed of silicon oxide tends to be superior to that composed of aluminum oxide in the function of suppressing the permeation of moisture in the electrolyte solution of the cell. For this reason, the electrically insulating oxide layer is more preferably a layer composed of silicon oxide.

The electrically insulating oxide layer can be formed on an outer surface of the base resin layer by, e.g., an evaporation method. The thickness of the electrically insulating oxide layer is preferably 10 to 300 nm.

When the outer case members have the electrically insulating oxide layer, a protective layer for protecting the oxide layer may be formed on a surface of the oxide layer that is opposite to the base resin layer.

As the outer case member having the electrically insulating oxide layer, it is possible to use laminated films that are commercially available under the name of, e.g., barrier films for use in medical applications, electronic devices, food, etc. The commercially available barrier films are laminated films formed of a three layered structure of the oxide layer, the base resin layer, and the thermal fusion resin layer.

Examples of the commercially available barrier films can include, e.g., "GL FILM" and "PRIME BARRIER" (both are trade names) manufactured by Toppan Printing CO., LTD., "MAXBARRIER" and "TL" (both are trade names) manufactured by Mitsui Chemicals Tohcello, Inc., "TECH-BARRIER" (trade name) manufactured by Mitsubishi Chemical Corporation, "IB-Film" (trade name) manufactured by Dai Nippon Printing Co., Ltd., and "ECOSYAL" (trade name) manufactured by TOYOBO CO., LTD.

The shape of the outer case may be, e.g., a polygon (such as triangle, quadrangle, pentagon, hexagon, heptagon, or octagon), a circle, or an ellipse in a plan view. When the outer case has a polygonal shape in a plan view, the terminal of the positive electrode and the terminal of the negative electrode may be drawn from the same side or different sides of the outer case to the outside.

<Air Diffusion Membrane>

When the sheet-type cell of this embodiment is an air cell, an air diffusion membrane may be disposed between the outer case and the water repellent membrane. The air diffusion membrane serves to supply the air that has been taken into the outer case to the positive electrode. The air diffusion membrane may be, e.g., a nonwoven fabric made of a resin such as cellulose, polyvinyl alcohol, polypropylene, or nylon. The thickness of the air diffusion membrane is preferably 100 to 250 µm.

<Others>

The thickness of the sheet-type cell (i.e., the length indicated by the letter a in FIGS. 3 and 6) is not particularly limited and may be appropriately changed depending on the use of the cell. One of the advantages of the cell having the sheet-type outer case is that the thickness can be reduced. In view of this, the thickness of the sheet-type cell is preferably, e.g., 1 mm or less.

The lower limit of the thickness of the sheet-type cell is not particularly limited, and may usually be 0.2 mm or more to maintain a predetermined amount of capacity.

(Method for Manufacturing Sheet-Type Cell)

Next, an embodiment of a method for manufacturing a sheet-type cell of this application will be described.

A first method for manufacturing a sheet-type cell of this embodiment is a method for manufacturing the above-described sheet-type cell of this application. The first manufacturing method includes disposing the first outer case member and the second outer case member on the respective opposite sides of the power generation element, and thermally welding to seal the first and second outer case members disposed on the respective opposite sides of the power generation element and the separator in a state where the outer portion of the separator facing neither the positive electrode nor the negative electrode is interposed between the periphery of the first outer case member and the periphery of the second outer case member.

With the first manufacturing method, it is possible to manufacture, e.g., the sheet-type cell illustrated in FIGS. 1-3.

A second method for manufacturing a sheet-type cell of this embodiment is a method for manufacturing the above-described sheet-type cell (sheet-type air cell) of this application. The second manufacturing method includes disposing the first outer case member and the second outer case member on the respective opposite sides of the power generation element provided with the water repellent membrane on the outer surface of the positive electrode in the power generation element, and thermally welding to seal the first and second outer case members disposed on the respective opposite sides of the power generation element, the water repellent membrane, and the separator in a state where the outer portion of the water repellent membrane not facing the positive electrode and the outer portion of the separator facing neither the positive electrode nor the negative electrode are interposed between the periphery of the first outer case member and the periphery of the second outer case member.

With the second manufacturing method, it is possible to manufacture, e.g., the sheet-type cell (sheet-type air cell) illustrated in FIGS. 4-6.

EXAMPLES

First, experimental results in which sealing properties of outer cases of sheet-type cells were evaluated will be described as reference experiments.

Experimental Example 1

A barrier film (manufactured by Toppan Printing CO., LTD), a polypropylene nonwoven fabric (thickness: 100 µm, melting point: 200° C. or less), and a polyethylene porous film (thickness: 80 µm, melting point: 150° C. or less, air permeability: 15000 sec/100 ml) were respectively cut into a size of 24 mm×24 mm to prepare two outer case members, a separator, and a water repellent membrane. The barrier film was a laminated film formed of a 15 µm nylon layer (base resin layer), a 40 µm polyethylene layer (thermal fusion resin layer having a melting point of 150° C. or less), and a 12 µm polyethylene terephthalate layer in which a deposited silica layer (oxide layer) was formed on the side of the base resin layer. The two outer case members had the above-described size. The polyethylene layer of each of the outer case members was disposed inside. A stack was formed by laying one of the outer case members, the separator, the water repellent membrane, and the other outer case member in this order. Then, a portion 5 mm in width from ends of three sides of the outer case members, the separator, the water repellent membrane along their peripheries were thermally welded together.

Next, a solution was prepared as an electrolyte solution by dissolving 20% by mass of ammonium chloride in a mixed solvent of water and glycerol (glycerol: 10% by mass). After 0.1 ml of the electrolyte solution was injected through an opening (remaining one side) of the stack, the opening was thermally welded 5 mm in width from an end of the one side to seal an outer case. Furthermore, a portion 2 mm in width from the outer edge of the outer case in the periphery of the outer case that was sealed by thermally welding was cut to produce an outer case for evaluation having a size of 20 mm×20 mm and the periphery that was sealed by thermally welding 3 mm in width.

In Experimental example 1, an outer case was produced by thermally welding at a temperature of 170° C. and an outer case was produced by thermally welding at a temperature of 200° C. to evaluate the difference in sealing properties due to thermally welding temperatures (the evaluation was similarly performed in each experimental example described later).

Experimental Example 2

An outer case for evaluation was produced in the same manner as in Experimental example 1 except that the water repellent membrane was changed to a PTFE porous film having a thickness of 80 µm.

Experimental Example 3

An outer case for evaluation was produced in the same manner as in Experimental example 1 except that the separator was changed to a commercially available polyethylene microporous film (melting point: 150° C. or less) and a water repellent membrane was not used.

Experimental Example 4

An outer case for evaluation was produced in the same manner as in Experimental example 2 except that the separator was changed to a cellophane film.

Experimental Example 5

An outer case for evaluation was produced in the same manner as in Experimental example 1 except that a separator and a water repellent membrane were not used and two outer case members were thermally welded to each other directly.

Sealing properties of the outer cases for evaluation of each of Experimental examples 1 to 5 were evaluated as below. Each outer case for evaluation was stored in a thermostat at 60° C., and then, a reduction in weight one day after the start of the storage of the outer case was measured to obtain a vaporization amount of the electrolyte solution. The proportion of the vaporization amount of the electrolyte solution to a weight of the electrolyte solution in the outer case for evaluation before storing was obtained as a "vaporization proportion of electrolyte solution" in order to evaluate the sealing properties of the outer case for evaluation. A "vaporization proportion of electrolyte solution" of the outer case for evaluation of each of Experimental examples 1, 3, and 5 was obtained by measuring not only the reduction described above but also a reduction in weight seven days after the start of the storage.

Table 1 indicates the evaluation results. The sign × indicates that an outer case for evaluation was not able to be thermally welded and leakage of the electrolyte solution was confirmed.

TABLE 1

| | Thermally welding temperature | Vaporization proportion of electrolyte solution (%) | |
|---|---|---|---|
| | (° C.) | One day after | Seven days after |
| Experimental example 1 | 170 | 2 | 8 |
| | 200 | 0 | 4 |
| Experimental example 2 | 170 | 55 | — |
| | 200 | 45 | — |
| Experimental example 3 | 170 | 1 | 7 |
| | 200 | 1 | 4 |
| Experimental example 4 | 170 | x | x |
| | 200 | x | x |
| Experimental example 5 | 170 | 1 | 2 |
| | 200 | 0 | 2 |

In the outer cases for evaluation of Experimental example 4 in which the cellophane film was used as the separator and the PTFE porous film was used as the water repellent membrane, the peripheries of the two outer case members were not able to be thermally welded at all. On the other hand, in the outer cases for evaluation of Experimental example 2, the polypropylene nonwoven fabric having a melting point of 200° C. or less was used as the separator instead of a cellophane film and the PTFE porous film was used as the water repellent membrane similarly. Although the PTFE porous film was used as the water repellent membrane, in the outer case for evaluation of Experimental example 2 produced by thermally welding at 200° C., the peripheries of the two outer case members were able to be thermally welded together in a state where the water repellent membrane and the separator were interposed between the outer case members, and the outer case had some degree of sealing properties.

In the outer cases for evaluation of Experimental example 3, only the polyethylene microporous film having a melting point of 150° C. or less was interposed between the two outer case members. In the outer cases for evaluation of Experimental example 1, the polyethylene porous film (water repellent membrane) having a melting point of 150° C. or less and the polypropylene nonwoven fabric (separator) having a melting point of 200° C. or less were interposed between the two outer case members. In the outer case for evaluation of Experimental example 3 and the outer case for evaluation of Experimental example 1 that were produced by thermally welding at 200° C., the peripheries of the outer case members were able to be thermally welded together more satisfactorily, and the outer cases had excellent sealing properties similarly to the outer cases for evaluation of Experimental example 5 in which the two outer case members were thermally welded to each other directly.

Next, the sheet-type cell of this application will be described in detail based on examples. However, the sheet-type cell of this application is not limited to the following examples.

Example

<Negative Electrode>

A negative electrode was produced by cutting an electrolytic zinc foil having a thickness of 50 µm into a main body portion having a size of 15 mm×15 mm and a shape having a terminal portion of 5 mm in width×15 mm in length.

<Positive Electrode>

A composition for forming a catalyst layer was prepared by mixing 100 parts by mass of carbon black ("Ketjenblack EC600JD (trade name)" manufactured by Lion Specialty Chemicals Co., Ltd.) with a DBP oil absorption of 495 cm$^3$/100 g and a specific surface area of 1270 m$^2$/g, 1 part by mass of phthalocyanine metal complex, 25 parts by mass of a dispersing agent, and 5000 parts by mass of ethanol.

Using porous carbon paper (thickness: 0.25 mm, porosity: 75%, air permeability (Gurley): 70 sec/100 ml) as a current collector, the composition for forming a catalyst layer was applied to the surface of the current collector by stripe coating so that the coating amount after drying was 10 mg/cm$^2$. Then, the composition was dried, resulting in the current collector that had a portion in which the catalyst layer was formed and a portion in which no catalyst layer was formed. This current collector was punched into a shape including the portion with the catalyst layer that was 15 mm×15 mm in size and the portion without the catalyst layer having a size of 5 mm in width×15 mm in length. The portion without the catalyst layer was to be a terminal. Thus, a positive electrode (air electrode) with a total thickness of 0.27 mm was produced.

<Separator>

A polypropylene nonwoven fabric with a thickness of 100 μm was made hydrophilic for an alkaline storage cell, was cut into 25 mm×25 mm, and was used as a separator.

<Water Repellent Membrane>

A polyethylene porous film that was the same as that of the water repellent membrane of Experimental example 1 was cut into 25 mm×25 mm, and was used as a water repellent membrane.

<Electrolyte Solution>

A solution obtained by dissolving ammonium chloride and polyoxyethylene having an average molecular weight of 7,00,000 in a mixed solvent of water and glycerol (glycerol: 10% by mass) was used as an electrolyte solution. The ammonium chloride was 20% by mass, and the polyoxyethylene was 8% by mass in the electrolyte solution.

<Cell Assembly>

Two barrier films were prepared by cutting a barrier film that was the same as that of Experimental example 1 into 25 mm×25 mm, and were used as outer case members. Nine air holes, each having a diameter of about 0.2 mm, were formed in a first outer case member that was to be located proximately to the positive electrode. The air holes were arranged in a matrix of three columns and three rows and were spaced at regular intervals (i.e., the center-to-center distance of adjacent air holes was 5 mm in both vertical and horizontal directions).

In a second outer case member that was to be located proximately to a negative electrode, a modified polyolefin ionomer film was attached in parallel with the side of the outer case member to a portion where the external terminals of the positive electrode and the negative electrode were to be arranged, in order to improve the sealing properties of the thermally welded portion between the external terminals and the outer case member.

The first outer case member proximate to the positive electrode, the water repellent membrane, the positive electrode, the separator, and the negative electrode were stacked in this order. Moreover, the second outer case member was stacked thereon such that the modified polyolefin ionomer film was positioned on leads of the positive electrode and the negative electrode. Three sides of the two outer case members along their peripheries were thermally welded together in a state where peripheries of the water repellent membrane and the separator were interposed between the peripheries of the outer case members, and thus a bag-like outer case was formed. Next after the electrolyte solution was injected through an opening of the outer case, the opening was thermally welded to seal the outer case, and consequently a sheet-type air cell was produced.

Comparative Example

<Separator>

A graft film (thickness: 30 μm) was disposed on one side of a cellophane film (thickness: 20 μm). The resulting film (size: 18 mm×18 mm, total thickness: 50 μm) was used as a separator. In this case, the graft film was composed of a graft copolymer obtained by graft copolymerization of acrylic acid with a polyethylene main chain.

<Water Repellent Membrane>

A polyethylene porous film that was the same as that of the water repellent membrane of Experimental example 1 was cut into 18 mm×18 mm, and was used as a water repellent membrane.

<Cell Assembly>

Two barrier films were prepared by cutting a barrier film that was the same as that of Experimental example 1 into 25 mm×25 mm, and were used as outer case members. Nine air holes, each having a diameter of about 0.2 mm, were formed in a first outer case member that was to be located proximately to a positive electrode. The air holes were arranged in a matrix of three columns and three rows and were spaced at regular intervals (i.e., the center-to-center distance of adjacent air holes was 5 mm in both vertical and horizontal directions). Then, the water repellent membrane was thermally welded to the inner surface of this outer case member with a hot-melt adhesive.

In a second outer case member that was to be located proximately to a negative electrode, a modified polyolefin ionomer film was attached in parallel with the side of the outer case member to a portion where the external terminals of the positive electrode and the negative electrode were to be arranged, in order to improve the sealing properties of the thermally welded portion between the external terminals and the outer case member.

The positive electrode and the negative electrode were the same as those of the example. The positive electrode, the separator, and the negative electrode were stacked in this order on the water repellent membrane of the outer case member proximate to the positive electrode. Moreover, the second outer case member was stacked thereon such that the modified polyolefin ionomer film was positioned on leads of the positive electrode and the negative electrode. Next, three sides of the two outer case members along their peripheries were thermally welded to each other directly without the water repellent membrane and the separator being interposed between the peripheries of the outer case members, and thus a bag-like outer case was formed. After an electrolyte solution that was the same as that of the example was injected through an opening of the outer case, the opening was thermally welded to seal the outer case, and consequently a sheet-type air cell was produced.

The cell of the example and that of the comparative example were connected to a discharge resistance of 3.9 kΩ, and were discharged. The discharge capacity was measured until the cell voltage was reduced to 0.9 V. Table 2 indicates the measurement results.

TABLE 2

| | Discharge capacity (mAh) |
|---|---|
| Example | 46 |
| Comparative example | 44 |

As indicated in Table 2, the cell of the example had discharge characteristics similar to those of the cell of the comparative example in which a laminated film of the conventional cellophane film and the graft film was used as a separator and the peripheries of the two outer case members were thermally welded to each other directly to seal the cell.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

The sheet-type cell of this application can be used in applications that use a variety of cells conventionally known, and can be used as a power supply for various devices.

DESCRIPTION OF REFERENCE NUMERALS 1, 100 Sheet-type cell (air cell)
10, 110 Positive electrode (air electrode)
11, 111 Terminal of positive electrode
20, 120 Negative electrode
21, 121 Terminal of negative electrode
30, 130 Separator
40, 140 Water repellent membrane
50, 150 Outer case
51, 151 Outer case member proximate to positive electrode
52, 152 Outer case member proximate to negative electrode
53, 153 Air hole

The invention claimed is:

1. A sheet-type cell, comprising:
an outer case comprising:
    a first outer case member; and
    a second outer case member; and
a power generation element provided between the first outer case member and the second outer case member, the power generation element comprising:
    a positive electrode proximate to the first outer case member;
    a negative electrode proximate to the second outer case member;
    a separator constituted by a porous resin sheet between the positive electrode and the negative electrode;
    an electrolyte solution, and
    a water repellent membrane between the first outer case member and the positive electrode,
wherein the outer case is sealed with a periphery of the separator interposed between a periphery of the first outer case member and a periphery of the second outer case member,
wherein the outer case is sealed with the periphery of the separator and a periphery of the water repellent membrane interposed between the peripheries of the first and second outer case members.

2. The sheet-type cell according to claim 1, wherein the water repellent membrane includes a porous layer made of a resin that fuses at a temperature of 200° C. or less.

3. The sheet-type cell according to claim 2, wherein the porous layer is made of a polyolefin.

4. The sheet-type cell according to claim 1, wherein the water repellent membrane has an air permeability of 20 sec/100 ml or more.

5. The sheet-type cell according to claim 1, wherein the porous resin sheet is made of a resin that fuses at a temperature of 200° C. or less.

6. The sheet-type cell according to claim 1, wherein the porous resin sheet is constituted by a polyolefin porous film or a polyolefin nonwoven fabric.

7. The sheet-type cell according to claim 1, wherein the separator has an air permeability of 10 to 3000 sec/100 ml.

8. The sheet-type cell according to claim 1, wherein the thermally fusible resin layer is disposed on an inner surface of the outer case.

9. The sheet-type cell according to claim 1, wherein the thermally fusible resin layer is made of a resin that fuses at a temperature of 200° C. or less.

10. The sheet-type cell according to claim 9, wherein the resin that fuses at a temperature of 200° C. or less is a polyolefin.

11. The sheet-type cell according to claim 1, wherein the thermally fusible resin layer is stacked on a resin layer that is to be a base.

12. The sheet-type cell according to claim 1, wherein the outer case member further includes an electrically insulating oxide layer.

13. A method for manufacturing the sheet-type cell according to claim 1,
the method comprising:
    stacking the first outer case member, the positive electrode, the separator, the negative electrode and the second outer case member; and
    thermally welding a periphery of the first outer case member and a periphery of the second outer case member in a state where an outer portion of the separator facing neither the positive electrode nor the negative electrode is interposed between the periphery of the first outer case member and the periphery of the second outer case member.

14. A method for manufacturing the sheet-type cell according to claim 1,
the method comprising:
    stacking the first outer case member, the water repellent membrane, the positive electrode, the separator, the negative electrode and the second outer case member; and
    thermally welding a periphery of the first outer case member and a periphery of the second outer case member in a state where an outer portion of the water repellent membrane not facing the positive electrode and an outer portion of the separator facing neither the positive electrode nor the negative electrode are interposed between the periphery of the first outer case member and the periphery of the second outer case member.

15. The method according to claim 14, wherein the water repellent membrane includes a porous layer made of a resin that fuses at a temperature of 200° C. or less.

16. The method according to claim 13, wherein the porous resin sheet is made of a resin that fuses at a temperature of 200° C. or less.

17. The method according to claim 14, wherein the porous resin sheet is made of a resin that fuses at a temperature of 200° C. or less.

* * * * *